April 29, 1924.
H. MORLIDGE
CLAW BAR
Filed Sept. 12, 1923
1,492,177
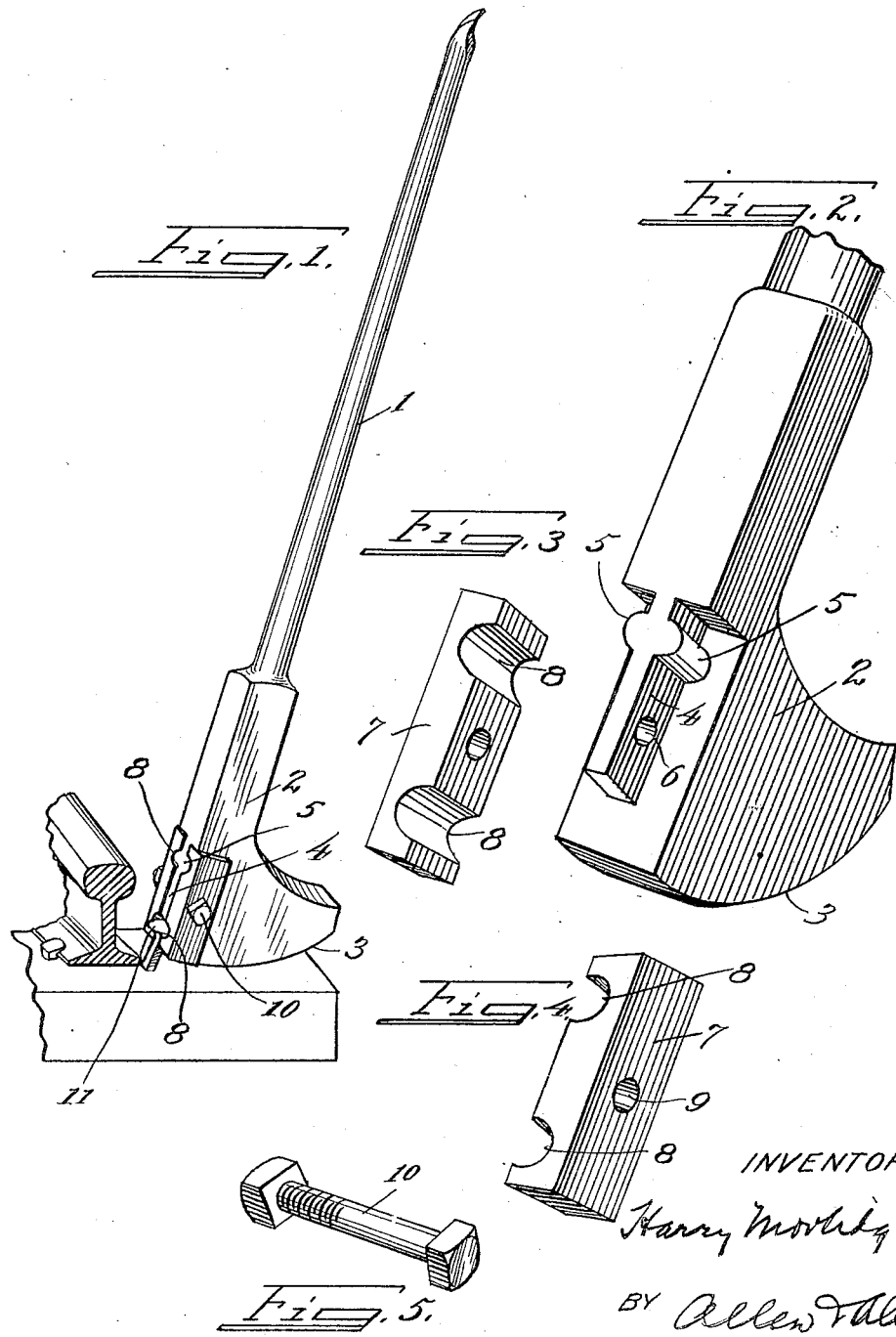

Patented Apr. 29, 1924.

1,492,177

UNITED STATES PATENT OFFICE.

HARRY MORLIDGE, OF LUDLOW, KENTUCKY.

CLAW BAR.

Application filed September 12, 1923. Serial No. 662,342.

*To all whom it may concern:*

Be it known that I, HARRY MORLIDGE, a citizen of the United States, and a resident of Ludlow, in the county of Kenton and State of Kentucky, have invented certain new and useful Improvements in Claw Bars, of which the following is a full, clear, and exact description, reference being had to the accompanying drawing, forming part of this specification.

My invention relates to claw bars such as are used to pull spikes in railroad work and the like.

There have been to my knowledge a wide variety of claw bars in the past, most of which have been subject to excessive breakage, and hence inconvenience and expense.

In the first place, it is an object of my invention to provide a claw bar in which the claws are both removable or detachable, and reversible, so that should the claws break, they can be shifted about in position, or new ones set into their place without loss of time.

In the next place, the object of my invention is to provide a detachable claw bar device in which the securing bolts or bolt for the claws, is relieved from strains upon use of the tool, and in which the claws themselves are so mounted on the claw bar as to most conveniently engage a spike head, and give the best form of cam surface on which the bar device may be rocked to extract the spike engaged.

These objects I accomplish by that certain construction and arrangement of parts to be hereinafter more specifically pointed out and claimed.

In the drawings:

Figure 1 is a perspective view of the device in use.

Figure 2 is a perspective view on a larger scale of the foot of the bar, with the claw pieces removed.

Figure 3 is a perspective of one of the claw pieces.

Figure 4 is a like view to Figure 3 taken from the other side of a claw piece.

Figure 5 is a perspective of the securing bolt for the claw pieces.

I have shown the claw bar as having a shank or handle 1, on which is formed the foot 2, having a cam surface 3 of large extent at the front of which is the claw mounting part. This part of the foot is in the form of a cut-away portion leaving a central rib 4, near the upper end of which are two rounded semi-cylindrical lugs 5, 5. There is a bolt hole in this rib as at 6. The rib is preferably of a height sufficient to leave the claws flush with it when mounted.

The claws are the same for left and right side of the mounting part, and have bodies 7, with a pair of semi-cylindrical grooves 8, 8, cut crosswise thereof near the two ends. These grooves are of a shape to snugly fit over the lugs 5. The claws have also a central bolt hole 9.

In assembling the bar the claws are set into the spaces on both sides of the mounting part with the grooves facing inwardly and the two upper grooves fitting over the lugs. The bolt 10 is then passed through the assembly and tightened down. If desired pins could be formed on the foot to take the place of the bolt, as will be plain without illustration.

The operation of the bar is to insert the claws at their lower ends so that the head of a spike as at 11, will be engaged between the lower faces of the two lower grooves of the claws. This will grasp the head of the spike, whereupon the operator rocks the bar on its cam surface, and lifts out the spike.

The downward strains on the two claws are taken up by the lug and groove engagement thereof at the upper end of the mounting part, thereby relieving the securing bolt. Both claws are the same, and interchangeable from left to right, and are also reversible so that should a breakage occur of a portion of the engaging portion of any claw, it can be turned upside down, and remounted, still giving ample groove and lug engagement to fully brace the device. Parting strain between the claws will be taken up by the central rib and bolt and the means for mounting the claws in place is very simple to operate.

Having thus described my invention, what I claim as new and desire to secure by Letters Patent, is:—

1. In a claw bar, a foot having a bearing surface, and claw pieces having similar recessed surfaces near each end therein, and arranged at the end of said bearing surface so that one pair of the recessed portions face each other to engage the head of the spike and the other pair to engage the foot, and means for demountably securing said claws in place on the foot.

2. In a claw bar, a foot having a bearing surface, and claw pieces having similar recessed surfaces therein, and arranged at the end of said bearing surface so that the recessed portions face each other to engage the head of the spike, and means for demountably securing said claws in place on the foot, said claws having an additional set of similar recesses therein to engage the foot so that upon inversion of one position of the same, a like double recessed formation will be formed for engaging the head of a spike and for engaging the foot on the other position.

3. In a claw bar, the combination with a foot having a rib extending lengthwise thereof, a pair of lugs on the sides of the rib, and claws having means for detachably securing them one on each side of the rib, said claws having each an upper and lower groove therein, adapted when mounted for one groove of each claw to engage the lug on its side of the rib, and the two other grooves of the claws to face each other, and provide a grasping member for the head of a spike.

HARRY MORLIDGE.